United States Patent Office 3,701,734
Patented Oct. 31, 1972

3,701,734
OIL ABSORBENT SLAG COMPOSITIONS
Arthur H. Stover, 125 Cross St.,
Wintersville, Ohio 43952
No Drawing. Filed Dec. 16, 1970, Ser. No. 98,861
Int. Cl. B41f 1/30; C04b 7/14; E06b 7/02
U.S. Cl. 252—88      4 Claims

ABSTRACT OF THE DISCLOSURE

Oil absorbent slag compositions are prepared by hydraulically decomposing molten slag from an electric smelting furnace and roasting the crushed slag at elevated temperatures.

---

This invention relates to oil absorbent slag compositions and to methods for their preparation and use.

Large quantities of molten slags are produced as by-products in the operation of electric furnaces for smelting metals from their ores. Such slags are generally considered to be waste products of little or no economic value and often present a disposal problem. I have now discovered that hydraulically decompsed slags can be converted to oil absorbent compositions of commercial value by roasting at elevated temperatures.

More specifically, the present invention is a method for making oil absorbent compositions which comprises hydraulically decomposing molten furnace slag and roasting the decomposed slag at a temperature between 212–1100° F. and preferably in the range 550–1100° F. The present invention also contemplates the absorbent compositions produced and methods for their use.

The present invention is not limited to molten furnace slags of any particular origin. However, superior oil absorbent compositions result when the slag is from an electric smelting furnace and particularly a ferro-chromium producing furnace. Details of such a furnace are given in the Kirk-Othmer Encyclopedia of Chemical Technology, Volume V, pages 451–472, Interscience Publishers, New York, Second Edition (1964). Such slags have the following composition on analysis:

| | Percent |
|---|---|
| Silicon dioxide | 30–40 |
| Aluminum oxide | 25–35 |
| Calcium oxide | 0–5 |
| Iron oxide | 0–2 |
| Magnesium oxide | 28–38 |
| Chromium as $Cr_2O_3$ | 1–5 |

In converting molten furnace slag to oil absorbent compositions according to the method of the present invention, the molten slag as it exits from the furnace is hydraulically decomposed by forcibly striking it with a stream of water under pressure. Water from a nearby nozzle is impinged against the body of slag with sufficient intensity to disrupt it into relatively small droplets. The disrupted and so-cooled slag solidifies into irregularly shaped pieces of a friable solid.

Activation is completed by roasting the slag in a kiln or oven at a temperature adequate to drive off bound water within the slag. It is apparent that the time required for activation is dependent on the temperature of roasting. Temperatures above the normal boiling point of water (212° F.) are effective but temperatures above 550° F. are generally preferred because of the more rapid activation obtained. The slag must not be heated too close to its fusion point less its absorptive capacity be lost; 1100° F. represents a safe upper limit for the roasting temperature.

Slag activated according to the method of the invention exhibits a high absorptive capacity for oils, greases, water and other liquids. The resultant compositions do not stain wood, cement or concrete floors or corrode polished metal surfaces making them particularly useful as industrial cleaning compositions. Concrete floors, metal floors and machines, and the like having oil and grease thereon are cleansed by lightly covering the surface to be de-oiled and/or degreased with an absorbent composition according to the present invention and then withdrawing the composition, generally by sweeping, now containing the removed oil and grease. The size of the absorbent granules utilized is not critical but relatively uniformly sized particles generally free of dust are preferred.

My invention is further described by means of the following non-limiting illustrative examples:

Molten slag from an electric smelting furnace used in the production of ferro-chromium alloy was hydraulically decomposed by striking with water exiting from a nozzle at a pressure of about 120–140 p.s.i. The slag was dried in an oil-fired furnace equipped with sheet iron skirting and a ¼" screen at the bottom of the skirt. The slag, placed between the bowl of the furnace and the skirt, was roasted at 550–1100° F. until it fragments and drops through the screen.

The heat activated material on analysis had the following chemical composition:

| | Percent |
|---|---|
| Silicon dioxide | 34.94 |
| Aluminum oxide | 28.52 |
| Iron oxide | 1.32 |
| Calcium oxide | .10 |
| Magnesium oxide | 33.36 |
| Chromium | 1.64 |

Further analysis showed the material to be essentially sulfate free and to contain only a trace quantity of chloride.

Corrosion testing was performed by comparing sample panels of black plate, terre plate and galvanized in direct contact with the composition against untreated controls. A similar series of tests was run in which both the test panels and the untreated controls were moistened with water. In both series, the panels in direct contact with the test composition were observed to be less corroded than the air exposed untreated controls.

The absorptive ability of the composition was tested by placing measured quantities of various test liquids in shallow metal containers and then adding one pound of the absorbent composition. More than one-half pint but less than a full pint of either ASTM oil No. one or water was completely absorbed.

Samples of wet absorbent compositions prepared as above were placed on a section of light gray painted concrete floor for 24 hours. No visual effect on the color of the floor was observed when the sample materials were removed.

Other variations in my invention will suggest themselves to those skilled in the art and my invention is as claimed.

I claim:

1. A method for making oil absorbent compositions which comprises hydraulically disrupting and cooling molten furnace slag by forcibly striking a body of said molten slag with a stream of water under pressure sufficient to disrupt said body of molten slag into small droplets and in sufficient amounts to cool said droplets into solid pieces and roasting the cooled slag pieces at a temperature between 212–1100° F. and below the fusion point of the slag for a time sufficient to drive off bound water, said slag having the composition:

| | Percent |
|---|---|
| Silicon dioxide | 30–40 |
| Aluminum oxide | 25–35 |
| Calcium oxide | 0–5 |
| Iron oxide | 0–2 |
| Magnesium oxide | 28–38 |
| Chromium as $Cr_2O_3$ | 1–5 |

2. A method according to claim 1 wherein the roasting temperature is above 550° C.

3. Oil absorbent compositions prepared by the process of claim 1.

4. Compositions according to claim 3 wherein the slag is from a furnace used to prepare ferro-chromium alloy.

References Cited

UNITED STATES PATENTS

| | | | |
|---|---|---|---|
| 3,366,474 | 1/1968 | Akita et al. | 75—130.5 |
| 3,271,139 | 9/1966 | Crago et al. | 75—130.5 |
| 3,198,624 | 8/1965 | Bell et al. | 75—130.5 |
| 3,158,464 | 11/1964 | Chynoweth | 75—130.5 |
| 3,155,466 | 11/1964 | Grutter et al. | 106—117 |
| 3,012,875 | 12/1961 | Senior | 75—130.7 |
| 2,674,530 | 4/1954 | Rassbach | 106—117 |
| 813,965 | 6/1904 | Grau | 106—117 |
| 982,945 | 1/1911 | Von Forell | 106—117 |
| 893,708 | 7/1908 | Colloseus | 106—117 |
| 817,158 | 8/1905 | Colloseus | 106—117 |

GEORGE F. LESMES, Primary Examiner

J. P. BRAMMER, Assistant Examiner

U.S. Cl. X.R.

106—117; 252—410